United States Patent
Nakashima (10) Patent No.: US 10,738,959 B2
(45) Date of Patent: Aug. 11, 2020

(54) VEHICULAR LAMP FITTING

(71) Applicant: STANLEY ELECTRIC CO., LTD., Tokyo (JP)

(72) Inventor: Daisuke Nakashima, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/438,035

(22) Filed: Jun. 11, 2019

(65) Prior Publication Data

US 2019/0390837 A1 Dec. 26, 2019

(30) Foreign Application Priority Data

Jun. 21, 2018 (JP) .................................. 2018-117933

(51) Int. Cl.
*F21S 43/239* (2018.01)
*F21V 8/00* (2006.01)

(52) U.S. Cl.
CPC .......... *F21S 43/239* (2018.01); *G02B 6/0018* (2013.01); *G02B 6/0036* (2013.01); *G02B 6/0038* (2013.01)

(58) Field of Classification Search
CPC .. G02B 6/0036; G02B 6/0038; G02B 6/0018; F21S 43/239
USPC ....... 362/511, 615, 617, 619, 620, 623, 625, 362/626, 628
See application file for complete search history.

(56) References Cited

U.S. PATENT DOCUMENTS

| 7,715,132 | B2 * | 5/2010 | Chang | G02B 5/045 359/831 |
| 2008/0192504 | A1 * | 8/2008 | Chou | G02B 6/0036 362/612 |
| 2008/0266879 | A1 * | 10/2008 | Chang | G02B 6/0021 362/309 |

(Continued)

FOREIGN PATENT DOCUMENTS

| DE | 20318691 U1 | 2/2004 |
| FR | 2948174 A1 | 1/2011 |

(Continued)

OTHER PUBLICATIONS

The extended European Search Report for the related European Patent Application No. 19181380.7 dated Aug. 2, 2019.

*Primary Examiner* — Laura K Tso

(74) *Attorney, Agent, or Firm* — Kenealy Vaidya LLP (57) ABSTRACT

A vehicular lamp fitting, comprising a light guiding plate having a front surface and a back surface, and a light source which emits light guided by the light guiding plate, wherein the front surface includes first light control surfaces, the back surface includes second light control surfaces, and concave portions each of which is disposed between two adjacent second light control surfaces, the first light control surface is a refraction surface which is configured such that the exit angle of the light from the light source in the horizontal direction, which is refracted and exits through the first light control surface, be a predetermined angle, and the second light control surface is a reflection surface which is configured such that the exit angle of the light from the light source in the vertical direction, which exits through the first light control surface, be a predetermined angle.

14 Claims, 9 Drawing Sheets

(56) References Cited

U.S. PATENT DOCUMENTS

| | | | |
|---|---|---|---|
| 2009/0116263 A1* | 5/2009 | Chen | G02B 6/0036 |
| | | | 362/615 |
| 2010/0002466 A1 | 1/2010 | Kim et al. | |
| 2011/0090713 A1* | 4/2011 | Chen | G02B 6/0036 |
| | | | 362/612 |
| 2013/0148372 A1* | 6/2013 | Shih | B60Q 1/00 |
| | | | 362/511 |
| 2014/0140084 A1 | 5/2014 | Zwick | |
| 2014/0321163 A1* | 10/2014 | Kao | G02B 6/0038 |
| | | | 362/619 |
| 2014/0362604 A1* | 12/2014 | Masuda | G02B 6/0038 |
| | | | 362/619 |
| 2015/0049509 A1* | 2/2015 | Meyers | G02B 6/0011 |
| | | | 362/612 |
| 2016/0109639 A1* | 4/2016 | Kurata | G02F 1/133615 |
| | | | 349/65 |

FOREIGN PATENT DOCUMENTS

| | | |
|---|---|---|
| JP | S59-043234 U | 3/1984 |
| JP | 2005-327649 A | 11/2005 |
| JP | 2018-006226 A | 1/2018 |

* cited by examiner

FRONT OF VEHICLE ⟷ REAR END OF VEHICLE

VEHICULAR LAMP FITTING

CROSS-REFERENCE TO RELATED APPLICATION

This application is based upon and claims the benefit of priority of the prior Japanese Patent Application No. 2018-117933, filed on Jun. 21, 2018, the entire contents of which are incorporated herein by reference.

FIELD

The present invention relates to a vehicular lamp fitting, and more particularly to a vehicular lamp fitting that can control not only an exit angle of the light in the vertical direction, but also an exit angle of the light in the horizontal direction from a light source which emits light through the surface of a light guiding plate.

BACKGROUND

A vehicular lamp fitting that includes: a light guiding plate having a front surface and a back surface on the opposite side of the front surface; and a light source which emits light guided by the light guiding plate, is known (e.g. Japanese Laid-open Patent Publication No. 2018-006226).

In the vehicular lamp fitting according to Japanese Laid-open Patent Publication No. 2018-006226, a part of the light from the light source, that is guided inside the light guiding plate, is internally reflected by V grooves (extending in the horizontal direction), which are disposed on the back surface of the light guiding plate, and is exits through the front surface.

SUMMARY

In the vehicular lamp fitting according to Japanese Laid-open Patent Publication No. 2018-006226, however, there is a problem in that the exit angle of the light in the vertical direction from the light source, which emits light from the front surface of the light guiding plate, is controllable by adjusting the angle of the V grooves, but the exit angle of the light in the horizontal direction is not controllable.

The present invention has been made in view of the above circumstances and has an object of providing a vehicular lamp fitting that can control not only an exit angle of the light in the vertical direction, but also an exit angle of the light in the horizontal direction from a light source which emits light through the surface of a light guiding plate.

In order to achieve the first object described above, an aspect of the present invention provides a vehicular lamp fitting, comprising: a light guiding plate having a front surface and a back surface disposed on the opposite side of the front surface; and a light source which emits light guided by the light guiding plate, wherein the front surface includes a plurality of first light control surfaces, the back surface includes a plurality of second light control surfaces corresponding to the plurality of first light control surfaces respectively, and a plurality of concave portions each of which is disposed between two adjacent second light control surfaces out of the plurality of second light control surfaces, the plurality of first light control surfaces, the plurality of second light control surfaces and the plurality of concave portions are disposed in parallel, extending in a first direction respectively, the light source emits light which is guided in the first direction by the light guiding plate, is internally reflected by the second light control surface, and exits through the first light control surface, the first light control surface is a refraction surface which is configured such that the exit angle of the light from the light source in the horizontal direction or the vertical direction, which is refracted and exits through the first light control surface, be a predetermined angle, and the second light control surface is a reflection surface which is configured such that the exit angle of the light from the light source in the vertical direction or the horizontal direction, which exits through the first light control surface, be a predetermined angle.

According to this aspect, a vehicular lamp fitting, which can control not only the exit angle of the light in the vertical direction (or the horizontal direction) from the light source, which exits through the surface of the light guiding plate 20, but also the exit angle thereof in the horizontal direction (or the vertical direction), is provided.

This is because the light guiding plate includes not only the second light control surface, which control the exit angle of the light from the light source in the vertical direction (or the horizontal direction), which exited through the surface, but also the first light control surface which controls the exit angle thereof in the horizontal direction (or the vertical direction).

In addition, in a preferred aspect of the invention described above, the first light control surface is a surface of which cross-section at a plane orthogonal to the first direction is an arc-shaped surface, which is convex toward the light-exiting direction.

In addition, in a preferred aspect of the invention described above, the first light control surface is a focus plane configured such that the exit angle of the light in the horizontal direction or the vertical direction, which is emitted from a focus plane, and is refracted and exits through the first light control surface, be a predetermined angle, and the focal point is set in a vicinity of the second light control surface.

In addition, in a preferred aspect of the invention described above, the concave portion is disposed in a portion of the light guiding plate, where the light from the light source, which is internally reflected by the second light control surface and exits through the first light control surface, is not blocked.

In addition, in a preferred aspect of the invention described above, the second light control surface includes a plurality of lens cut portions, and the plurality of lens cut portions are a plurality of V grooves which are disposed in parallel, extending in a second direction orthogonal to the first direction.

In addition, in a preferred aspect of the invention described above, the light guiding plate is curved at least in one of the longitudinal direction and the lateral directions.

DESCRIPTION OF EMBODIMENTS

Hereinafter, a vehicle lamp unit 10 that represents an embodiment of the present invention will be described with reference to the accompanying drawings. It should be noted that corresponding components in the respective drawings will be denoted by same reference signs and redundant descriptions thereof will be omitted.

Figure 1:
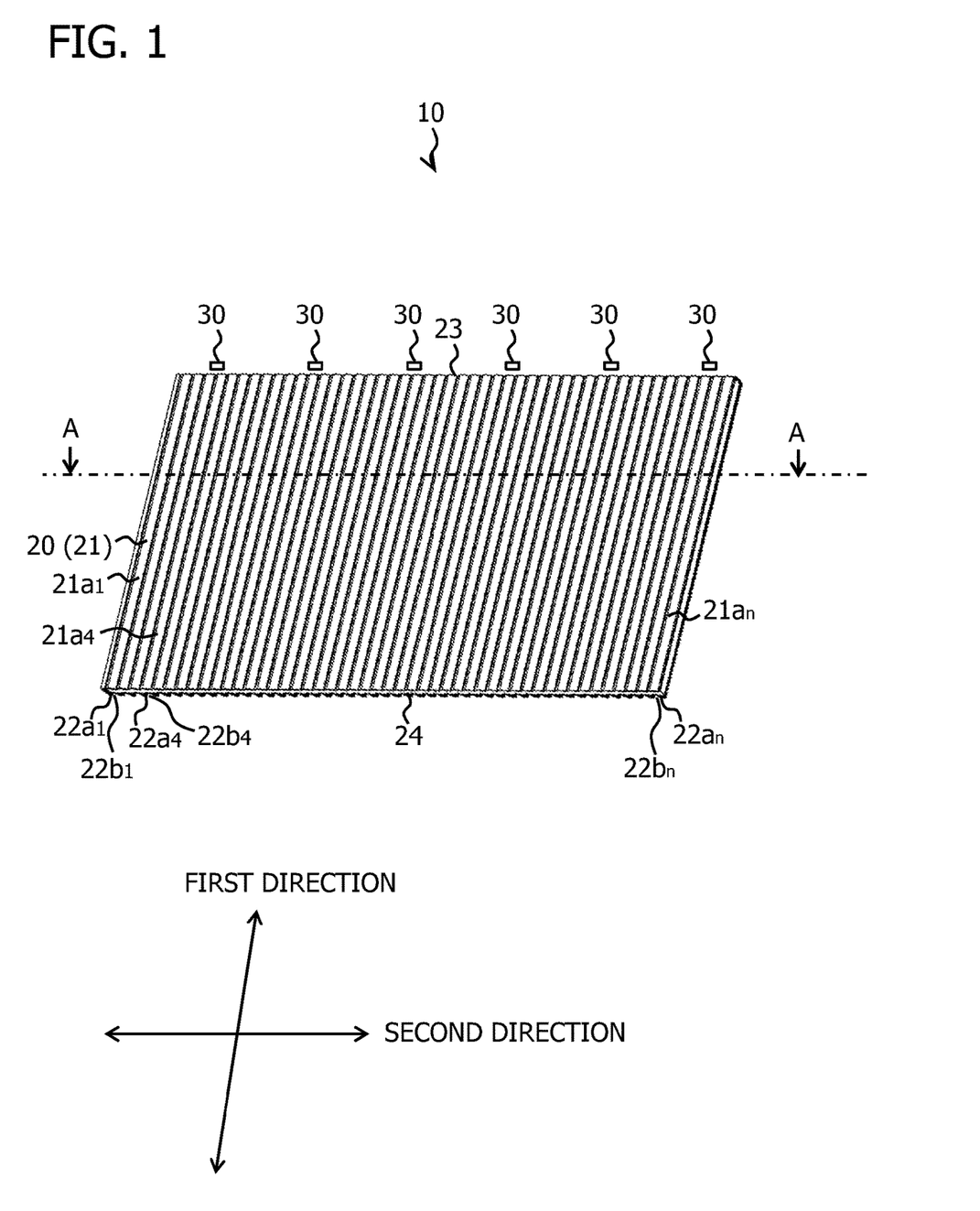
FIG. 1 is a perspective view of the vehicular lamp fitting 10
Figure 2:
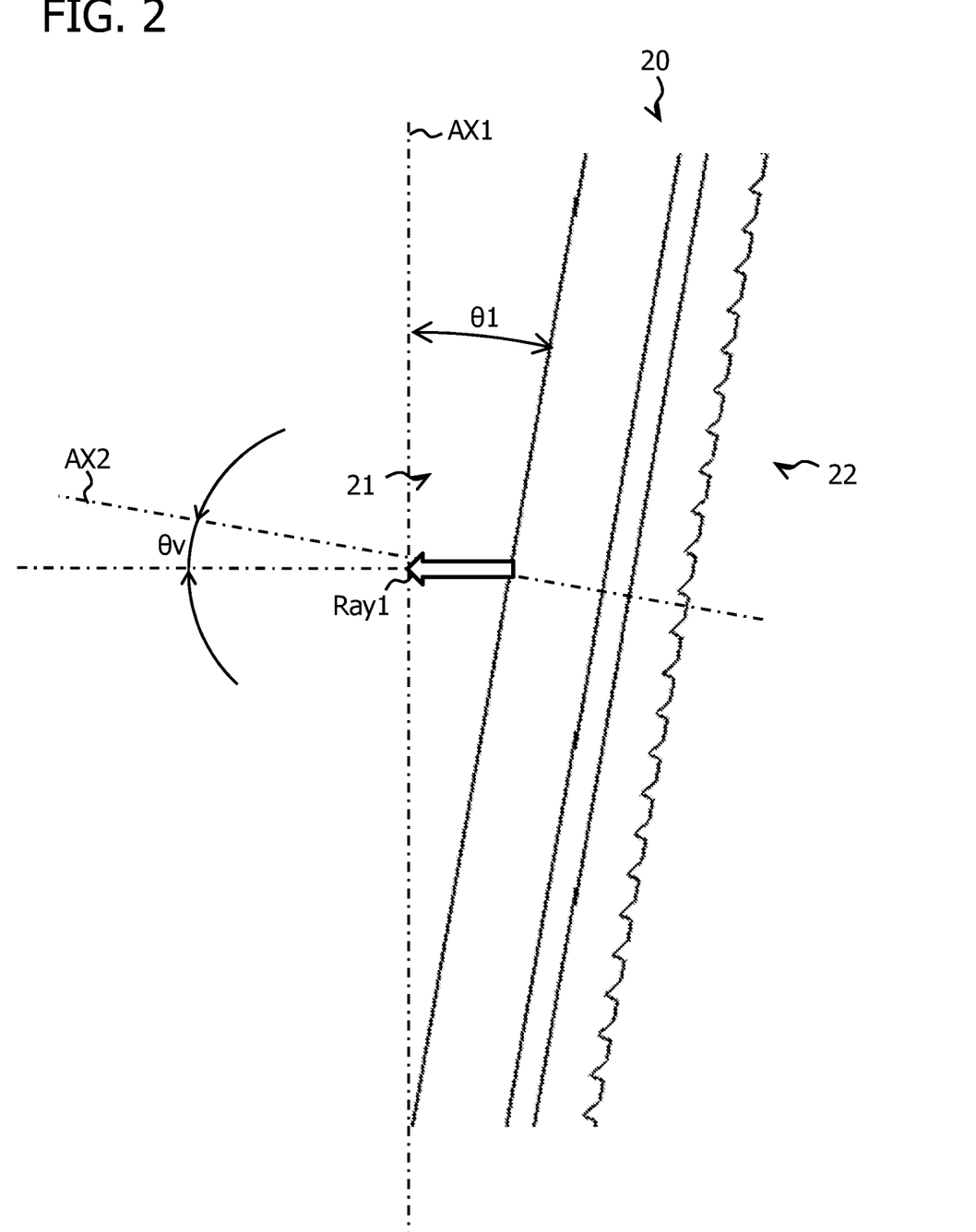
FIG. 2 is a side view of the vehicular lamp fitting 10
Figure 3:
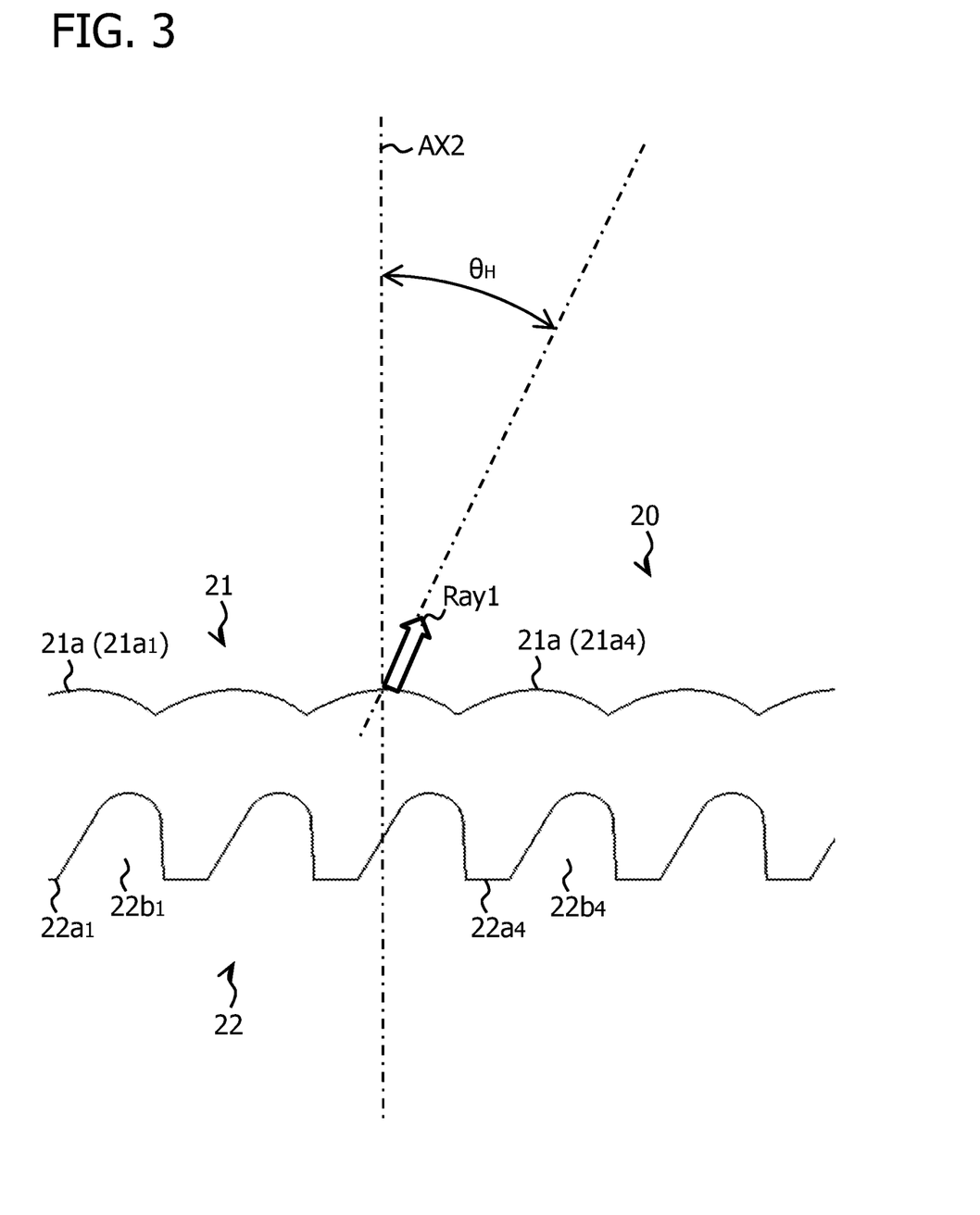
FIG. 3 is a cross-sectional views (partial) sectioned at A-A in FIG. 1
Figure 4:
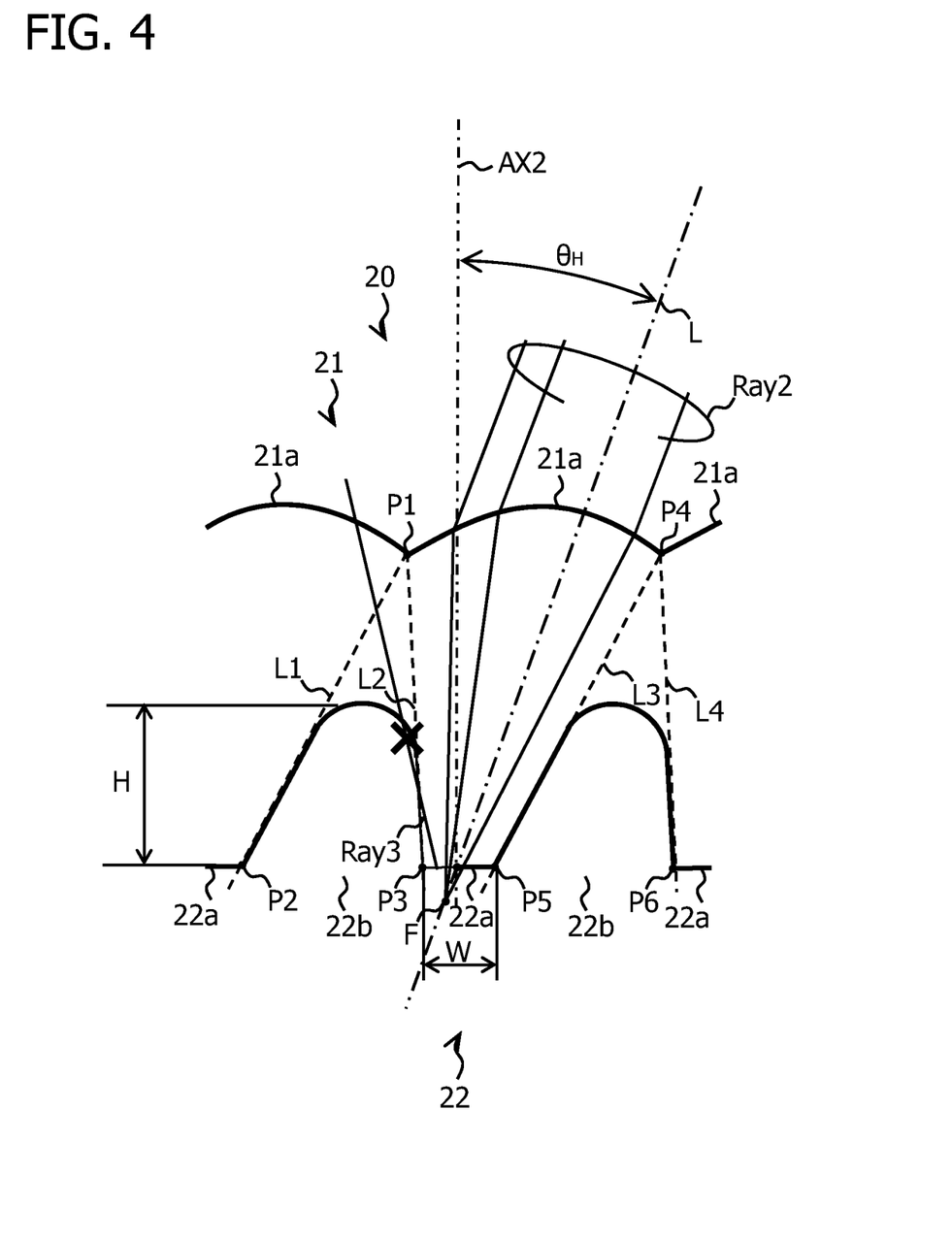
FIG. 4 is a cross-sectional views (partial) sectioned at A-A in FIG. 1

FIG. 1 is a perspective view of the vehicular lamp fitting 10, FIG. 2 is a side view of the vehicular lamp fitting 10, and FIG. 3 and FIG. 4 are cross-sectional views (partial) sectioned at A-A in FIG. 1.

The vehicular lamp fitting 10 illustrated in FIG. 1 is a signal lamp fitting (or sign lamp fitting), that is used as a tail lamp, a position lamp, a stop lamp, a turn signal lamp or the like, and is mounted on the left and right sides of the rear end of a vehicle (e.g. automobile) respectively. The vehicular lamp fittings 10 on the left and right sides are identical and mounted symmetrically, and therefore in the following, the vehicular lamp fitting 10 mounted on the right side on the rear end of the vehicle (right side facing the rear end of the vehicle), will be described.

As illustrated in FIG. 1, the vehicular lamp fitting 10 includes: a light guiding plate 20; and light sources 30 which emit light guided by the light guiding plate 20 (red light when the vehicular lamp fitting 10 is used as a tail lamp).

The light source 30 is a semiconductor light-emitting element, such as an LED and LD, which includes a rectangular (e.g. 1-mm square) light-emitting surface, and is mounted on a substrate (not illustrated) in a state of the light-emitting surface facing an upper end face 23 of the light guiding plate 20. For example, a plurality of light sources 30 are disposed along the upper end face 23 of the light guiding plate 20. The optical axis of the light source 30 extends in a first direction. The substrate is fixed on a housing (not illustrated) or the like by screws.

As illustrated in FIG. 2, the light guiding plate 20 is a light guiding plate including a front surface 21 and a back surface 22 on the opposite side of the front surface 21, and is an inner lens, for example. The light guiding plate 20 is a plate type (flat plate type) light guiding plate. The light guiding plate 20 is made of a transparent resin such as an acrylic resin or polycarbonate, and is molded by injection molding. The basic thickness of the light guiding plate 20 is 1 to 4 mm, for example.

The light guiding plate 20 is disposed in an attitude that is inclined from the reference axis AX1, which extends in the vertical direction, by a predetermined receding angle θ1. In some cases the light guiding plate 20 may be disposed in an attitude that is inclined from the reference axis, which extends in the vehicle width direction, by a predetermined receding angle (not illustrated).

As illustrated in FIG. 1, the front surface 21 of the light guiding plate 20 includes a plurality of first light control surfaces $21a_1$ to $21a_n$.

The first light control surface $21a_1$ to $21a_n$ are disposed in parallel, extending in a same direction (first direction in FIG. 1). In the following, the first light control surfaces $21a_1$ to $21a_n$ are called the first light control surface 21a, unless distinction is necessary.

As shown in FIG. 3, the first light control surface 21a is a refracted surface which is configured such that the horizontal exit angle of the light Ray 1 from the light source 30 refracted and exited from the first light control surface 21a is a predetermined angle $\theta_H$. The dashed line indicated by AX2 in FIG. 3 is the reference axis which extends in the plate thickness direction of the light guiding plate 20. This reference axis is hereafter referred to as a reference axis AX2.

The first light control surface 21a is, for example, a surface of which cross-section, at a plane orthogonal to the first direction is arc-shaped, which is convex toward the light-exiting direction (the light-emitting direction), that is a cylindrical surface of which cylindrical axis extends in the first direction.

In concrete terms, as illustrated in FIG. 4, the first light control surface 21a is a focus plane configured such that the exit angle of the light Ray 2 (virtual ray), which is emitted from the focal point F and is refracted and exits from the first light control surface 21a, be a predetermined angle $\theta_H$. Each angle $\theta_H$ of the first light control surfaces $21a_1$ to $21a_n$ may be the same or mutually different. Depending on the target light distribution pattern, an appropriate angle $\theta_H$ is selected.

The focal point F is set in a vicinity of the second light control surface 22a. In concrete terms, the focal point F is set on the line L, which is inclined from the reference axis AX2 by the angle $\theta_H$, and is outside the light guiding plate 20. The focal point F is not limited to this position as long as the focal point is in vicinity of the second light control surface 22a, and may be inside the light guiding plate 20, or may at a position that deviates from the line L.

As illustrated in FIG. 1, the back surface 22 of the light guiding plate 20 includes a plurality of second light control surfaces $22a_1$ to $22a_n$ corresponding to the first light control surfaces $21a_1$ to $21a_n$ respectively, and a plurality of concave portions $22b_1$ to $22b_n$ each of which is disposed between the two adjacent second light control surfaces, out of the second light control surfaces $22a_1$ to $22a_n$.

The second light control surfaces $22a_1$ to $22a_n$ and the concave portions $22b_1$ to $22b_n$ are disposed in parallel, extending in a same direction (first direction in FIG. 1). In the following, the second light control surfaces $22a_1$ to $22a_n$ are called the second light control surface 22a, unless distinction is necessary. The concave portions $22b_1$ to $22b_n$ are called the concave portion 22b, unless distinction is necessary.

The second light control surface 22a is a reflection surface which internally reflects the light from the light source 30, so that the exit angle of the light Ray 1 from the light source 30 in the vertical direction, which exits through the first light control surface 21a, becomes a predetermined angel $\theta_V$ (see FIG. 2).

As illustrated in FIG. 4, the second light control surface 22a is formed so as to be symmetrical with respect to the reference axis AX2, which passes through the intersection between: the line L which inclines from the reference axis AX2 by the angle $\theta_H$; and the second light control surface 22a, for example. The width W of the second light control surface 22a is preferably as small as possible, within the limits of the durability of the light guiding plate 20 and the easiness of injection molding (easiness of creating a mold).

Figure 5:
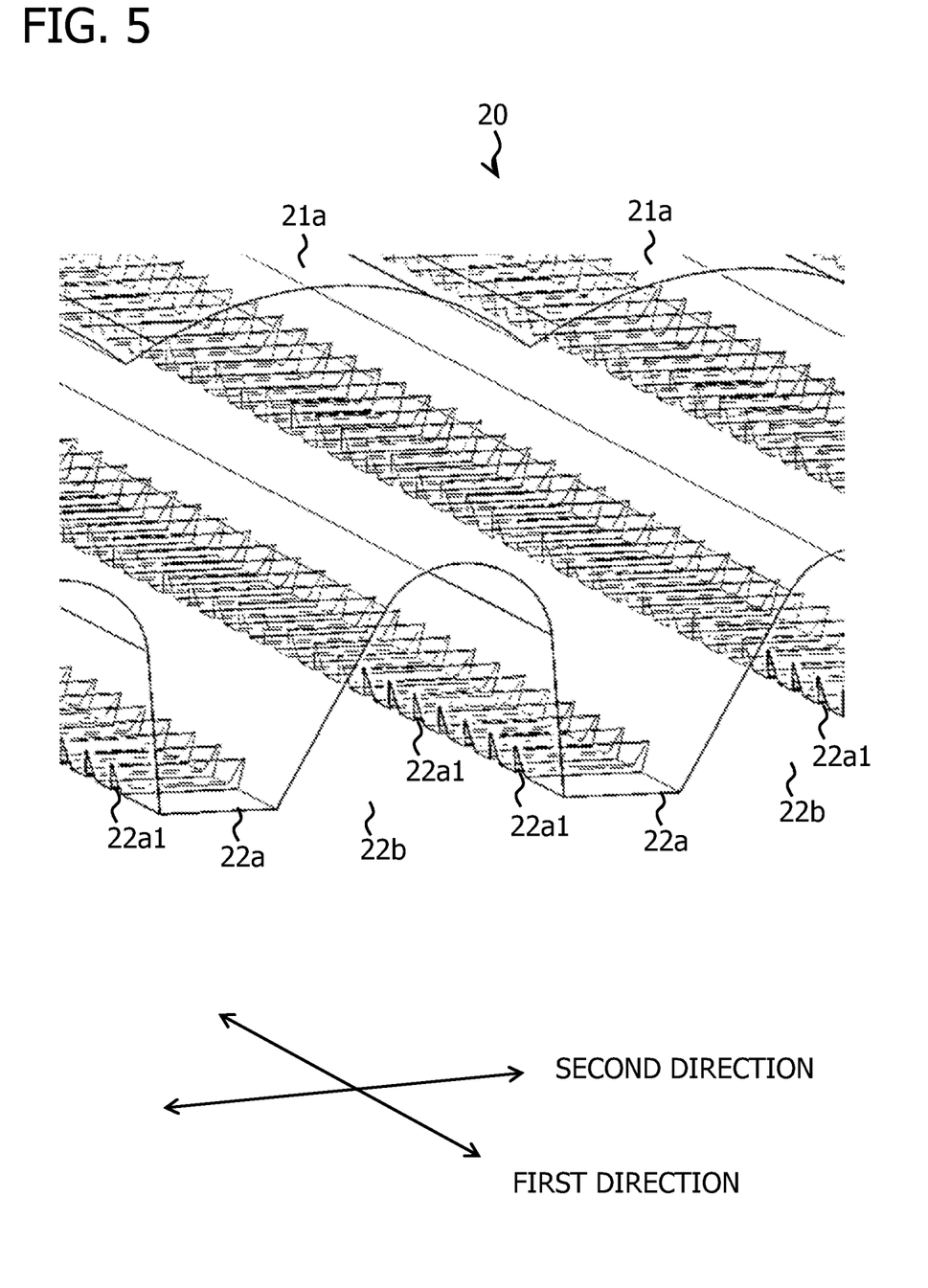
FIG. 5 is a perspective view of a cross-section (partial) at A-A in FIG. 1.

FIG. 5 is a perspective view of a cross-section (partial) at A-A in FIG. 1.

As illustrated in FIG. 5, the second light control surface 22a includes a plurality of lens cut portions 22a1. The plurality of lens cut portions 22a1 are, for example, a plurality of V grooves which are disposed in parallel extending in the second direction orthogonal to the first direction. In the following, the lens cut portion 22a1 is called a V groove 22a1. The angle of the V groove 22a1 (angle between one line and the other line constituting the "V" shape) is set such that the exit angle of the light Ray 1 in the vertical direction from the light source 30, which exits through the first light control surface 21a, be a predetermined angle $\theta_V$ (see FIG. 2). Each angle $\theta_V$ of the second light control surfaces $22a_1$ to $22a_n$ may be the same or mutually different. Depending on the target light distribution pattern, an appropriate angle $\theta_V$ is selected.

As illustrated in FIG. 4, when the light Ray 3 from the light source 30, internally reflected on the second light control surface 22a, exits through the adjacent first light control surface 21a (adjacent to the left in FIG. 4), it becomes uncontrolled light and causes glare etc.

Therefore in order to suppress the light Ray 3 from the light source 30, which is internally reflected on the second light control surface 22a, exiting through the adjacent first light control surface 21a (adjacent to the left in FIG. 4), a concave portion 22b is disposed. Then the light Ray 3 from the light source 30, internally reflected on the second light control surface 22a, is blocked by the concave portion 22b (e.g. internally reflected by the concave portion 22b), hence the light Ray 3 exiting through the adjacent first light control surface 21a (adjacent to the left in FIG. 4), is suppressed. Further, the light from the light source 30, which is internally reflected by the concave portion 22b and exits through the first light control surface 21a, increases, therefore a vehicular lamp fitting, which efficiently forms a target light distribution pattern using less number of light sources 30, is implemented.

The concave portion 22b is disposed in the light guiding plate 20 in a portion that does not block the light from the light source 30, which is internally reflected by the second light control surface 22a and exits from the first light control surface 21a. In concrete terms, the concave portion 22b is disposed between the lines L1 and L2, and between the lines L3 and L4 in FIG. 4. The concave portion 22b is an approximately a U-shaped concave portion of which bottom face is curved in an arc shape. The depth H of the concave portion 22b is preferably as deep as possible, within the limits of the durability of the light guiding plate 20, and easiness of injection molding (easiness of creating a mold).

As illustrated in FIG. 4, the line L1 is a line connecting: an intersection P1 between the first light control surface 21a at the center and a first light control surface 21a on the left side thereof; and a right end point P2 of a second light control surface 22a on the left side of the second light control surface 22a at the center. The line L2 is a line connecting: the intersection P1; and the left end point P3 of the second light control surface 22a at the center. In the same manner, the line L3 is a line connecting: an intersection P4 between the first light control surface 21a at the center and a first light control surface 21a on the right side thereof; and a right end point P5 of the second light control surface 22a at the center. The line L4 is a line connecting: the intersection P4; and the left end point P6 of a second light control surface 22a on the right side of the second light control surface 22a at the center.

In the case of the vehicular lamp fitting 10 having the above mentioned configuration, when the light source 30 is turned ON, the light from the light source 30 enters the light guiding plate 20 through the upper end face 23 of the light guiding plate 20, and is internally reflected by the front surface 21 and the back surface 22 of the light guiding plate 20, whereby the light is guided toward the lower end face 24 of the light guiding plate 20 (that is, in the first direction).

A part of the light from the light source 30, which is guided inside the light guiding plate 20, is internally reflected by the second light control surface 22a (V groove 22a1), disposed on the back surface 22 of the light guiding plate 20, and exits through the first light control surface 21a.

The first light control surface 21a is configured as a focus plane where the focal point F is set in the vicinity of the second light control surface 22a, hence, as illustrated in FIG. 3, the exit angle of the light Ray 1 in the horizontal direction from the light source 30, which exits through the first light control surface 21a, is controlled to be a predetermined angle $\theta_H$.

The angle of the V groove 22a1 is set such that the exit angle of the light in the vertical direction from the light source 30, which exits through the first light control surface 21a, be a predetermined angle $\theta_V$, hence, as illustrated in FIG. 2, the exit angle of the light Ray 1 in the vertical direction from the light source 30, which exits through the first light control surface 21a, is controlled to be the predetermined angle $\theta_V$.

By controlling the exit angles of the light in the horizontal direction and the vertical direction from the light source 30, which exits through the first light control surfaces $21a_1$ to $21a_n$ respectively, a target light distribution pattern having a luminous intensity distribution required for a tail lamp, a position lamp, a stop lamp and a turn signal lamp or the like, can be formed.

As described above, according to this embodiment, a vehicular lamp fitting 10, which can control not only the exit angle of the light in the vertical direction from the light source 30, which exits through the surface 21 of the light guiding plate 20, but also the exit angle thereof in the horizontal direction, is provided.

This is because the light guiding plate 20 includes not only the second light control surface 22a, which control the exit angle of the light from the light source 30 in the vertical direction, which exited through the surface 21, but also the first light control surface 21a which controls the exit angle thereof in the horizontal direction.

A modification will be described next.

FIG. 6A and FIG. 6B to FIG. 9 are diagrams for describing the modification of the light guiding plate 20.

Figure 6A:
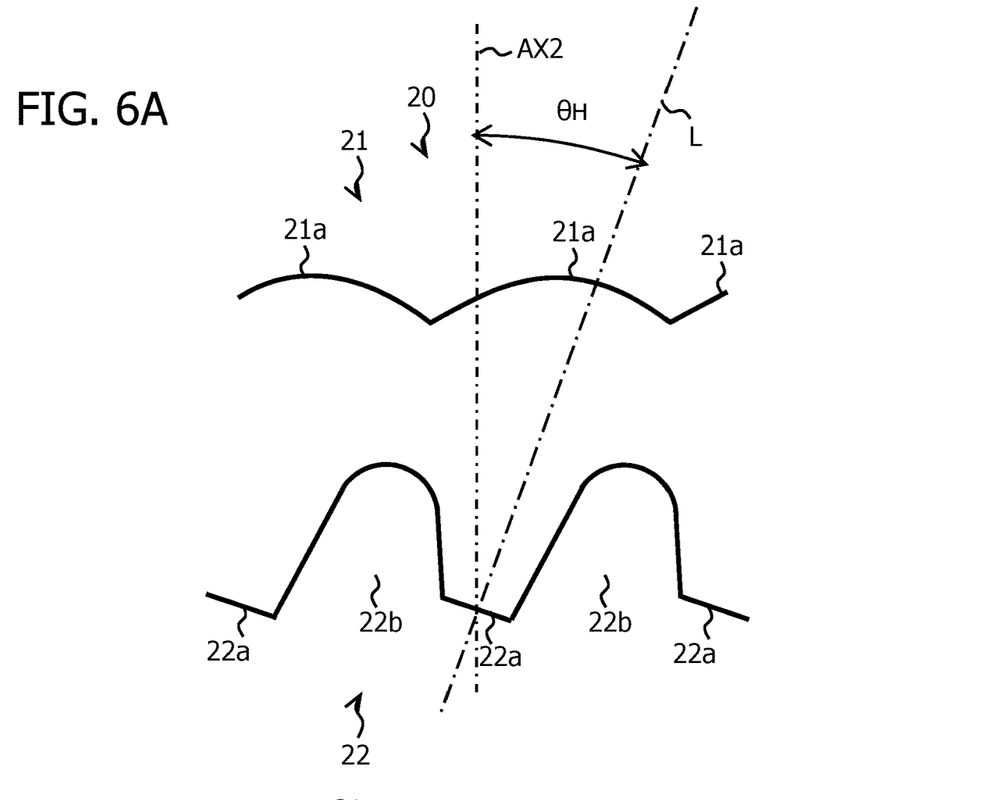
FIG. 6A and FIG. 6B are diagrams for describing the modification of the light guiding plate 20.

In the above mentioned embodiment, an example when the second light control surface 22a is a surface orthogonal to the reference axis AX2, extending in the plate thickness direction of the light guiding plate 20, was described, but the present invention is not limited to this. For example, as illustrated in FIG. 6A, the second light control surface 22a may be a surface orthogonal to the line L, which is inclined from the reference axis AX2 by the angle $\theta_H$. Then the light from the light source 30, which exits through the first light control surface 21a (reflected light from the second light control surface 22a), can be increased.

Figure 6B:
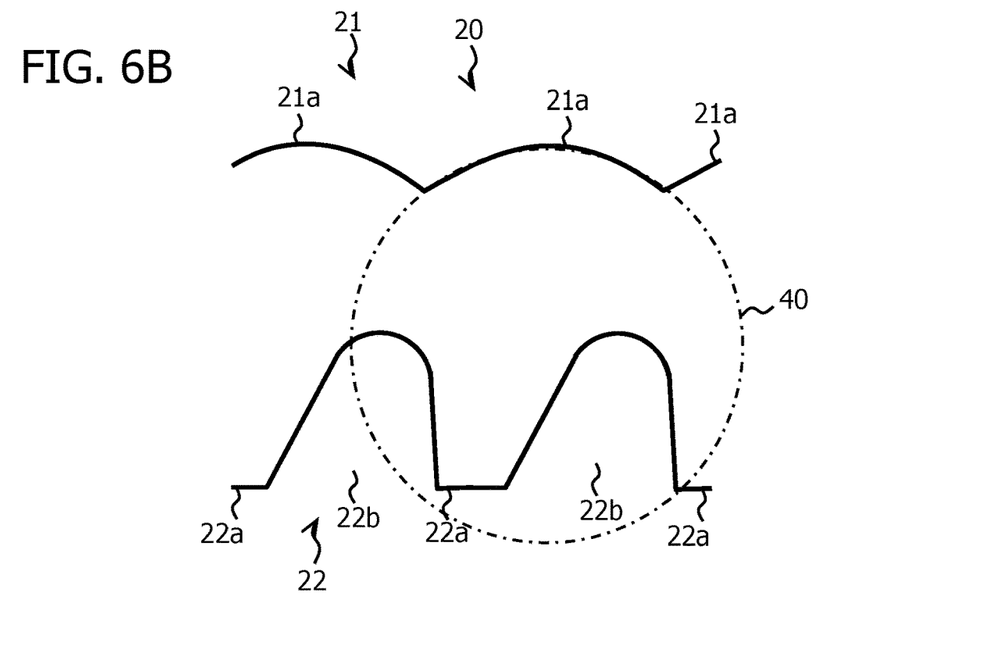

In the above mentioned embodiment, an example when the first light control surface 21a is the focus 1 plane, in which the focal point F is set in the vicinity of the second light control surface 22a, was described, but the present invention is not limited to this. For example, as illustrated in FIG. 6B, the first light control surface 21a may be an arc-shaped surface 40, of which shape is appropriately the same as the focus plane 21a.

Figure 7A:
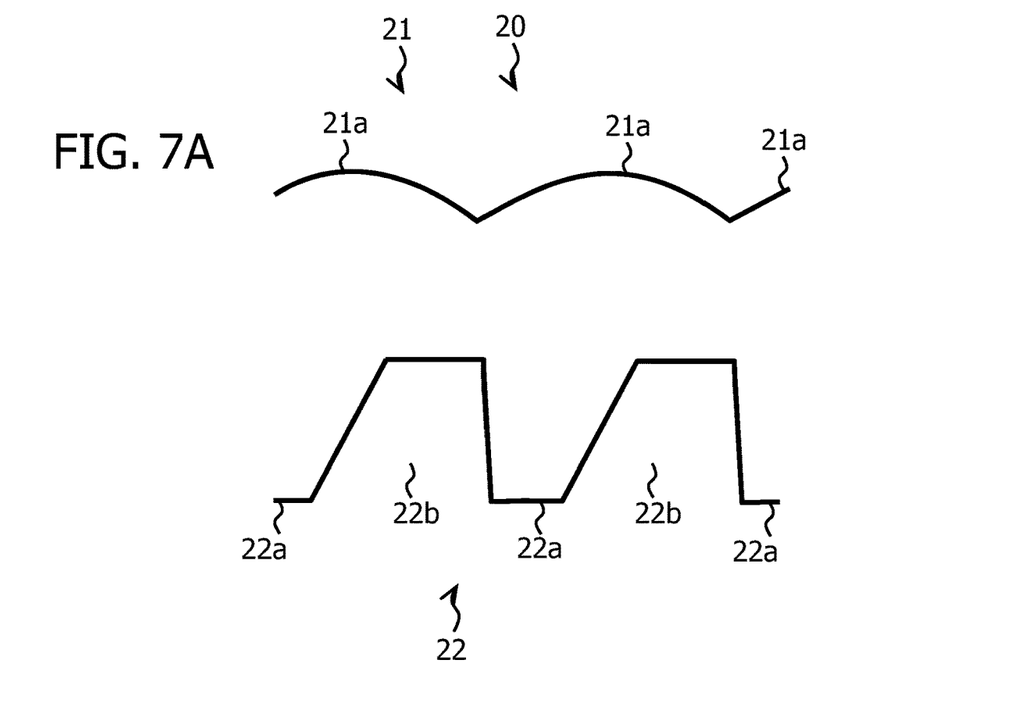
FIG. 7A and FIG. 7B are diagrams for describing the modification of the light guiding plate 20.
Figure 7B:
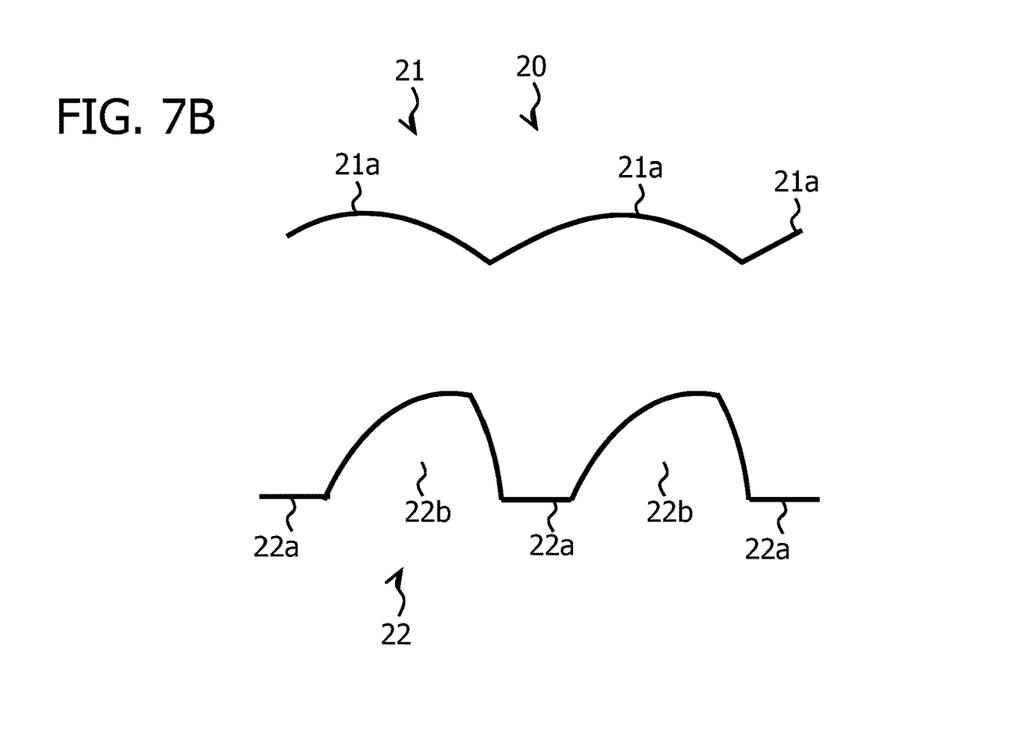

In the above mentioned embodiment, an example when the concave portion 22b is a concave portion having an approximately U shape, where the bottom surface is curved in an arc shape, was described, but the present invention is not limited to this. For example, as illustrated in FIG. 7A, the concave portion 22b may be a concave portion having an approximately U shape, where the bottom surface includes corners. Further, as illustrated in FIG. 7B, the concave portion 22b may be a concave portion having an approximately U shape, which is configured by only curved portions without including any linear portions.

Figure 8A:
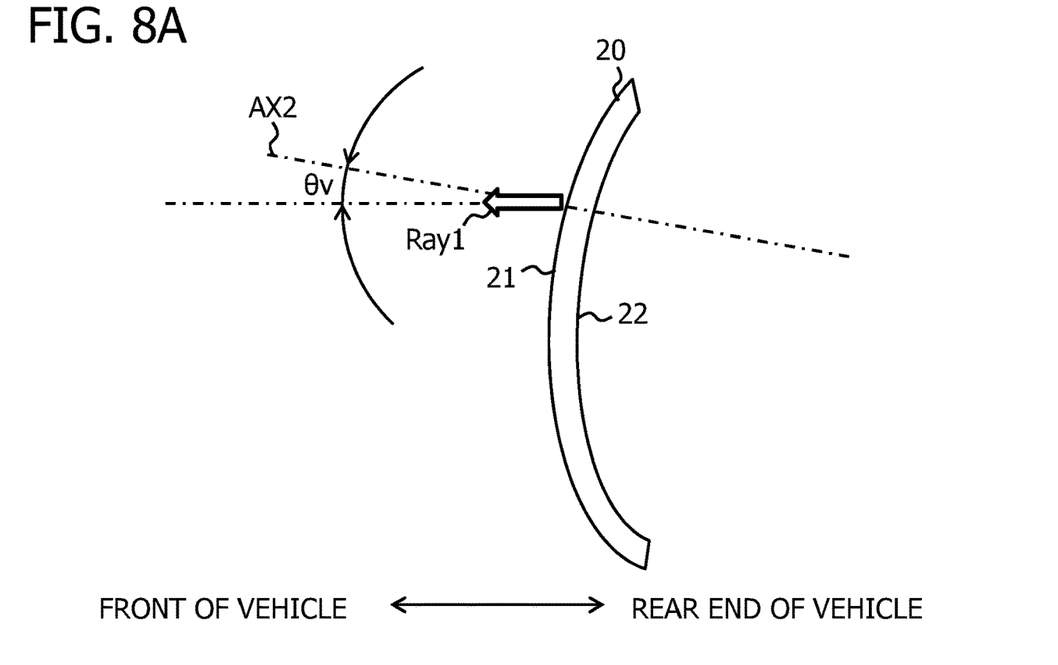
FIG. 8A and FIG. 8B are diagrams for describing the modification of the light guiding plate 20.
Figure 8B:
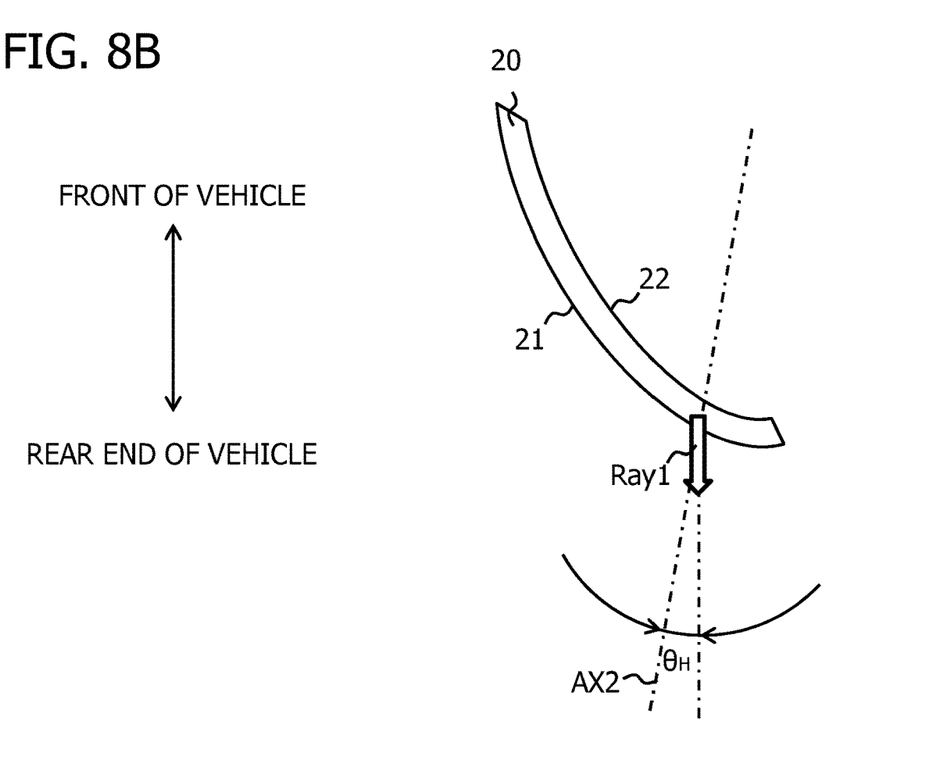

FIG. 8A is a side view of the light guiding plate 20 (modification) and FIG. 8B is a top view of the light guiding plate 20 (modification).

In the above mentioned embodiment, an example when the light guiding plate 20 is a plane type light guiding plate, was described, but the present invention is not limited to this. For example, as illustrated in FIG. 8A, a light guiding plate 20, which is curved in the longitudinal direction, may be used, or as illustrated in FIG. 8B, a light guiding plate, which is curved in the lateral direction, may be used, or a light guiding plate, which is curved in the upper, lower, left and right directions (not illustrated), may be used.

Figure 9:
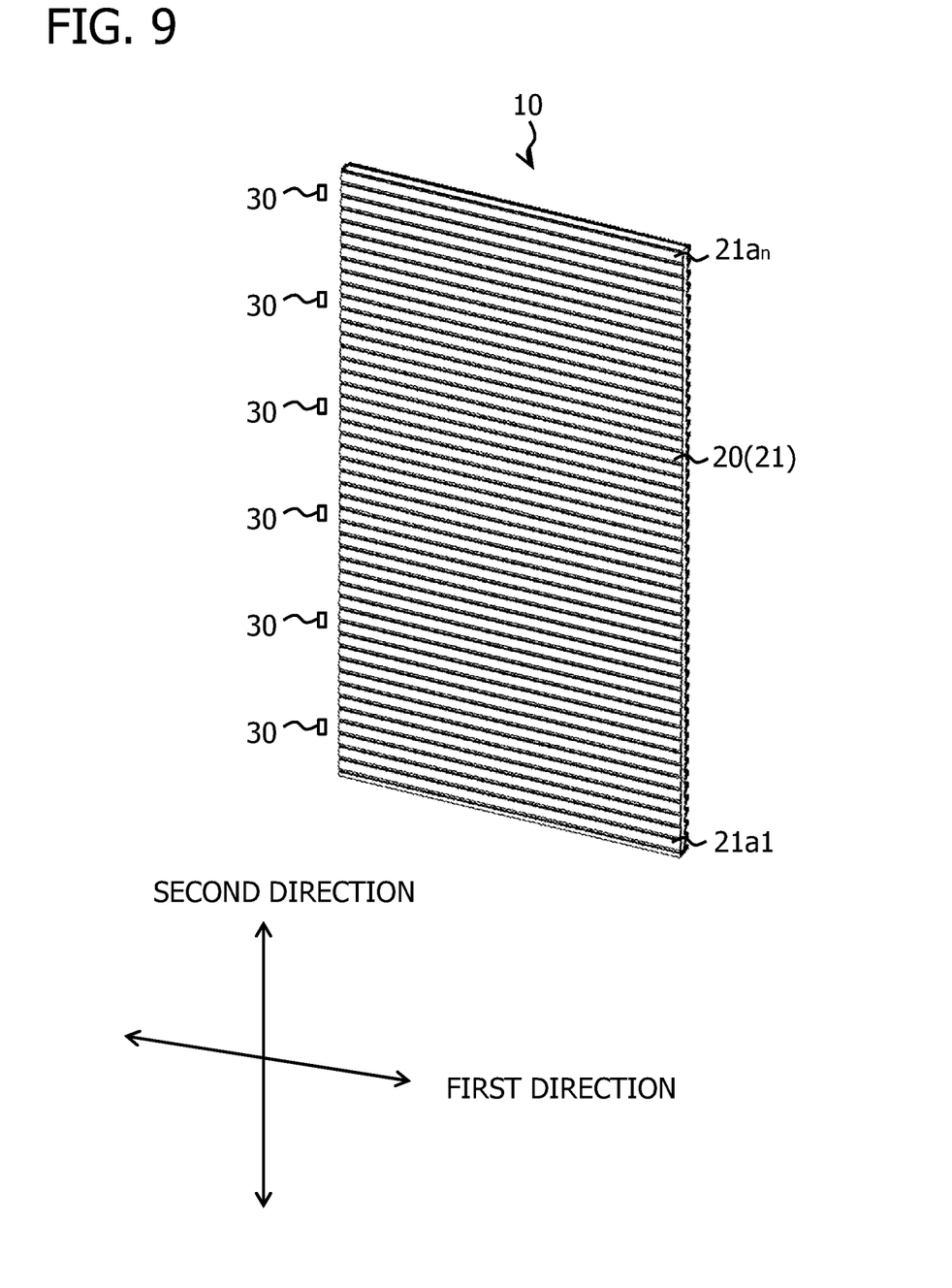
FIG. 9 is a diagram for describing the modification of the light guiding plate 20.

As illustrated in FIG. 9, the vehicular lamp fitting 10 may be used in a state of rotating 90° to the left (or right).

All the numeric values of each of the embodiments are given only for illustration purpose, and appropriate numeric values different from these numeric values can be, of course, used.

Each of the embodiments is given only for illustration purpose in all respects. The present invention is not limited to each of the embodiments in its interpretation. The present invention can be carried out in various ways without departing from its spirit or principal feature.

The invention claimed is:

1. A vehicular lamp fitting, comprising:
a light guiding plate having a front surface and a back surface disposed on the opposite side of the front surface; and
a light source which emits light guided by the light guiding plate, wherein
the front surface includes a plurality of first light control surfaces,
the back surface includes a plurality of second light control surfaces corresponding to the plurality of first light control surfaces respectively, and a plurality of concave portions each of which is disposed between two adjacent second light control surfaces out of the plurality of second light control surfaces,
the plurality of first light control surfaces, the plurality of second light control surfaces and the plurality of concave portions are disposed in parallel, extending in a first direction respectively,
the plurality of first light control surfaces and the plurality of second light control surfaces, which corresponds to the plurality of first light control surfaces respectively, are arranged at positions opposing each other with the light guiding plate interposed therebetween,
the light source emits light which is guided in the first direction by the light guiding plate, is internally reflected by the second light control surface, and exits through the first light control surface,
the first light control surface is a refraction surface which is configured such that the exit angle of the light from the light source in one of the horizontal direction and the vertical direction, which is refracted and exits through the first light control surface, is a first predetermined angle to a first reference axis on a first plane formed by a second direction crossing the first direction on the front surface and the first reference axis, the first reference axis extending in a plate thickness direction of the light guiding plate, the second light control surface is a reflection surface which is configured such that the exit angle of the light from the light source in the other of the vertical direction and the horizontal direction, which exits through the first light control surface, is a second predetermined angle to the first reference axis on a second plane formed by the first direction and the first reference axis,
the plurality of concave portions each has a shape that does not block first reflected light, which is internally reflected by the second light control surface and exits through the first light control surface corresponding to the second light control surface on which the first reflected light reflects, and
the plurality of concave portions each has a reflection surface that internally reflects at least a portion of second reflected light, which is internally reflected by the second light control surface and exits through the first light control surface being adjacent to the first light control surface through which the first reflected light exits.

2. The vehicular lamp fitting according to claim 1, wherein the first light control surface is a focus surface of which cross-section at a plane orthogonal to the first direction is an arc-shaped surface, which is convex toward the light-exiting direction.

3. The vehicular lamp fitting according to claim 2, wherein
the first light control surface is a plane configured such that the exit angle of the light in the one of the horizontal direction and the vertical direction, which is emitted from a focus point of the focus surface, and is refracted and exits through the first light control surface, is the first predetermined angle to the first reference axis on the first plane, and
the focal point is set in a vicinity of the second light control surface.

4. The vehicular lamp fitting according to claim 1, wherein
the second light control surface includes a plurality of lens cut portions, and
the plurality of lens cut portions are a plurality of V grooves which are disposed in parallel, extending in the second direction.

5. The vehicular lamp fitting according to claim 1, wherein the light guiding plate is curved at least in one of a longitudinal direction and a lateral direction of the light guiding plate.

6. The vehicular lamp fitting according to claim 1, wherein each of the plurality of concave portions has a U-shape of which a bottom face is curved in an arc shape.

7. The vehicular lamp fitting according to claim 1, wherein each of the plurality of concave portions is arranged between a first line and a second line on the first plane,
the first line connects a first intersection between the first light control surface and an other first light control surface next to the first light control surface on a first side thereof, and a second end point on a second side, opposite to the first side, of the second light control surface corresponding to the first light control surface,
the second line connects the first intersection and a first end point on the first side of the second light control surface corresponding to the first light control surface.

8. The vehicular lamp fitting according to claim 2, wherein each of the concave portions is arranged between a first line and a second line on the first plane, the first line connects a first intersection between the first light control surface and an other first light control surface next to the first light control surface on a first side thereof, and a second end point on a second side, opposite to the first side, of the second light control surface corresponding to the first light control surface,
the second line connects the first intersection and a first end point on the first side of the second light control surface corresponding to the first light control surface.

9. The vehicular lamp fitting according to claim 1, wherein a focus of the focus surface is set on a third line and is outside of the second light control surface, the third line being inclined from the first reference axis and penetrating the first light control surface and the second light control surface corresponding each other.

10. The vehicular lamp fitting according to claim 1, wherein the light guiding plate is disposed in an attitude that is inclined from a second reference axis extending in the other of the vertical direction and the horizontal direction by a first receding angle or that is inclined from a third reference axis extending in a vehicle width direction by a second receding angle.

11. The vehicular lamp fitting according to claim 1, wherein a thickness of the light guiding plate is 1 to 4 mm.

12. The vehicular lamp fitting according to claim 10, wherein a thickness of the light guiding plate is 1 to 4 mm.

13. The vehicular lamp fitting according to claim 1, wherein the light source emits red light.

14. The vehicular lamp fitting according to claim 1, wherein the vehicle lamp fitting is used as one of a tail lamp, a position lamp, a stop lamp, and a turn signal lamp.

* * * * *